United States Patent

Genise

Patent Number: 6,044,721
Date of Patent: *Apr. 4, 2000

[54] CONTROL FOR CONTROLLER-ASSISTED LARGE BACKLASH JAW CLUTCHES IN MAIN AND AUXILIARY SECTIONS

[75] Inventor: Thomas A. Genise, Dearborn, Mich.

[73] Assignee: Eaton Corporation, Cleveland, Ohio

[*] Notice: This patent is subject to a terminal disclaimer.

[21] Appl. No.: 09/148,873

[22] Filed: Sep. 8, 1998

[51] Int. Cl.$^7$ ................................................. B60K 41/08
[52] U.S. Cl. ............................................ 74/335; 74/336 R
[58] Field of Search .............................. 74/335, 336 R, 74/745

[56] References Cited

U.S. PATENT DOCUMENTS

| | | | |
|---|---|---|---|
| 4,361,060 | 11/1982 | Smyth | 74/866 |
| 4,527,447 | 7/1985 | Richards | 74/336 |
| 4,754,665 | 7/1988 | Vandervoort | 74/745 |
| 4,850,236 | 7/1989 | Braun | 74/337 |
| 4,974,468 | 12/1990 | Reynolds | 74/477 |
| 4,989,706 | 2/1991 | Morscheck | 192/53 |
| 5,390,561 | 2/1995 | Stine | 74/331 |
| 5,435,212 | 7/1995 | Menig | 74/745 |
| 5,582,558 | 12/1996 | Palmeri | 477/109 |
| 5,651,292 | 7/1997 | Genise | 74/745 |
| 5,661,998 | 9/1997 | Genise | 74/335 |
| 5,735,771 | 4/1998 | Genise | 477/111 |
| 5,737,969 | 4/1998 | Braun et al. | 74/477 |
| 5,738,195 | 4/1998 | Gluys et al. | 192/53.31 |
| 5,738,196 | 4/1998 | Gluys et al. | 192/53.331 |
| 5,743,143 | 4/1998 | Carpenter | 74/336 |
| 5,904,635 | 5/1999 | Genise et al. | 74/335 X |

*Primary Examiner*—Khoi Q. Ta
*Attorney, Agent, or Firm*—Howard D. Gordon

[57] ABSTRACT

A control for enhanced manual shifting in a computer-assisted (48) vehicular splitter-type compound transmission (16) having a nonsynchronized, enlarged backlash main section (16A) shifted by a manually operated shift lever (31) and a controller (42). The splitter section (16E) is provided with a three-position (L, H, N) actuator (46) and is commanded to a splitter-neutral position upon sensing a main section shift to neutral to reduce the inertia of the main shaft assembly and reduce the need to synchronize the main section.

11 Claims, 4 Drawing Sheets

CONTROL FOR CONTROLLER-ASSISTED LARGE BACKLASH JAW CLUTCHES IN MAIN AND AUXILIARY SECTIONS

RELATED APPLICATIONS

This application is related to the following co-pending applications and assigned to EATON CORPORATION, the assignee of this application:

Ser. No. 09/053,092 filed Apr. 1, 1998 and titled ENGINE FUEL CONTROL FOR COMPLETING SHIFTS IN CONTROLLER-ASSISTED, MANUALLY SHIFTED TRANSMISSIONS Ser. No. 09/053,090 filed Apr. 1, 1998 and titled ADAPTIVE NEUTRAL SENSING Ser. No. 09/053,091 filed Apr. 1, 1998 and titled JAW CLUTCH ENGAGEMENT CONTROL FOR ASSISTED, MANUALLY SHIFTED, SPLITTER-TYPE TRANSMISSION SYSTEM Ser. No. 09/053,181 filed Apr. 1, 1998 and titled ADAPTIVE SPLITTER ACTUATOR ENGAGEMENT FORCE CONTROL Ser. No. 08/822,668 filed Mar. 24, 1997 and titled SEMI-AUTOMATIC SHIFT IMPLEMENTATION WITH SYNCHRONIZED TRANSMISSION Ser. No. 09/346,381, filed the same date as this application, and titled CONTROL FOR CONTROLLER-ASSISTED, MANUALLY SHIFTED, SYNCHRONIZED, SPLITTER-TYPE COMPOUND TRANSMISSIONS

BACKGROUND OF THE INVENTION

1. Field of the Invention

The present invention relates to a controller-assisted, manually shifted vehicular transmission system including a splitter-type compound transmission. The system will sense a shift into or intent to shift into main section neutral and will automatically shift the splitter section into neutral, allowing the main section, which is provided with enhanced backlash jaw clutches, to be engaged into a target ratio without a need for synchronization and with relatively low force and, thus, relatively low driver effort and shift harshness. Upon sensing completion of the main section shift into a target ratio, the splitter section will be caused to engage in an appropriate splitter ratio.

More particularly, in a preferred embodiment of the present invention, a splitter or combined splitter-and-range-type compound synchronized transmission for heavy-duty vehicles is provided with controls and actuators for manually performed dynamic forward main section shifting without requiring excessive force to be applied by the operator or the operator to cause substantially synchronous conditions. In a preferred embodiment, main section shifts are performed without requiring manual throttle or master clutch manipulation by lever shifting with automatic engine control to cause torque breaks for shifting into neutral and/or to synchronize for engaging the splitter target gear ratio.

2. Description of the Prior Art

Compound manually shifted mechanical transmissions of the range, splitter and/or combined range/splitter type are in wide use in heavy-duty vehicles and are well known in the prior art, as may be seen by reference to U.S. Pat. Nos. 4,754,665; 5,272,929; 5,370,013 and 5,390,561, 5,546,823; 5,609,062 and 5,642,643, the disclosures of which are incorporated herein by reference. Typically, such transmissions include a main section shifted directly or remotely by a manual shift lever and one or more auxiliary sections connected in series therewith. The auxiliary sections most often were shifted by a slave actuator, usually pneumatically, hydraulically, mechanically and/or electrically operated, in response to manual operation of one or more master switches. Shift controls for such systems by be seen by reference to U.S. Pat. Nos. 4,455,883; 4,550,627; 4,899,607; 4,920,815; 4,974,468; 5,000,060; 5,272,931; 5,281,902; 5,222,404; 5,350,561 and 5,737,696, the disclosures of which are incorporated herein by reference.

Three-position splitter actuators and transmission systems utilizing same are disclosed in U.S. Pat. Nos. 5,651,292 and 5,661,998, the disclosures of which are incorporated herein by reference.

Fully or partially automated transmission systems wherein a microprocessor-based electronic control unit (ECU) receives input signals indicative of various system operating conditions and processes same according to logic rules to issue command output signals to one or more system actuators are known in the prior art, as may be seen by reference to U.S. Pat. Nos. 4,361,060; 4,593,580; 4,595,986; 4,850,236; 5,435,212; 5,582,069; 5,582,558; 5,620,392; 5,651,292; 5,679,096; 5,682,790 and 5,735,771; the disclosures of which are incorporated herein by reference.

U.S. Pat. No. 4,527,446, the disclosure of which is incorporated herein by reference, discloses a fully automated, blocked-type transmission wherein the main section is automatically shifted to main section neutral during each shift.

Prior art synchronized transmissions for medium- and heavy-duty vehicles were not totally satisfactory, as excessive force was required to operate the synchonizers, the synchronized jaw clutch assemblies tended to be large, expensive and/or complicated and expensive, while with non-synchronized transmissions, excessive skill was required to shift non-synchronized transmissions.

SUMMARY OF THE INVENTION

A preferred embodiment of the present invention involves a computer-assisted mechanical compound transmission system wherein the main section is provided with jaw clutches having a backlash of about 5-to-15 times greater than normal backlash, is shifted by a manually controlled shift lever, and the engine is fueled and/or the auxiliary sections are shifted by actuators at least partially controlled by an ECU to enhance shifting. The ECU uses sensed and/or calculated inputs indicative of system operating parameters, such as operation of a splitter switch and/or a range switch, position and/or rate of change of position of the shift lever, engaged gear ratio, engine speed, output shaft speed, clutch condition and/or throttle pedal position, to assist shifting by controlling the three-position splitter actuator shift actuator and preferably also engine fueling and/or operation of the range shift actuator.

In accordance with the present invention, the drawbacks of the prior art are minimized or overcome by the provision of a control method/system that includes logic rules or an algorithm using a number of inputs to determine when a manual shift into the main transmission section occurs and to automatically cause the splitter section to be shifted into splitter section neutral. This will reduce the inertia of the rotating elements being clutched by the main section jaw clutches, allowing the main section to be engaged considerably out of synchronous, while not causing an objectionable amount of harshness to the vehicle operator.

Accordingly, it is an object of the present invention to provide ECU assistance for enhanced shifting of a nonsynchronized mechanical compound splitter-type transmission having an enlarged backlash main section shifted by a manually operated shift lever.

This and other objects and advantages of the present invention will become apparent from a reading of the following description of the preferred embodiment taken in connection with the attached drawings.

DESCRIPTION OF THE PREFERRED EMBODIMENT

Figure 1:
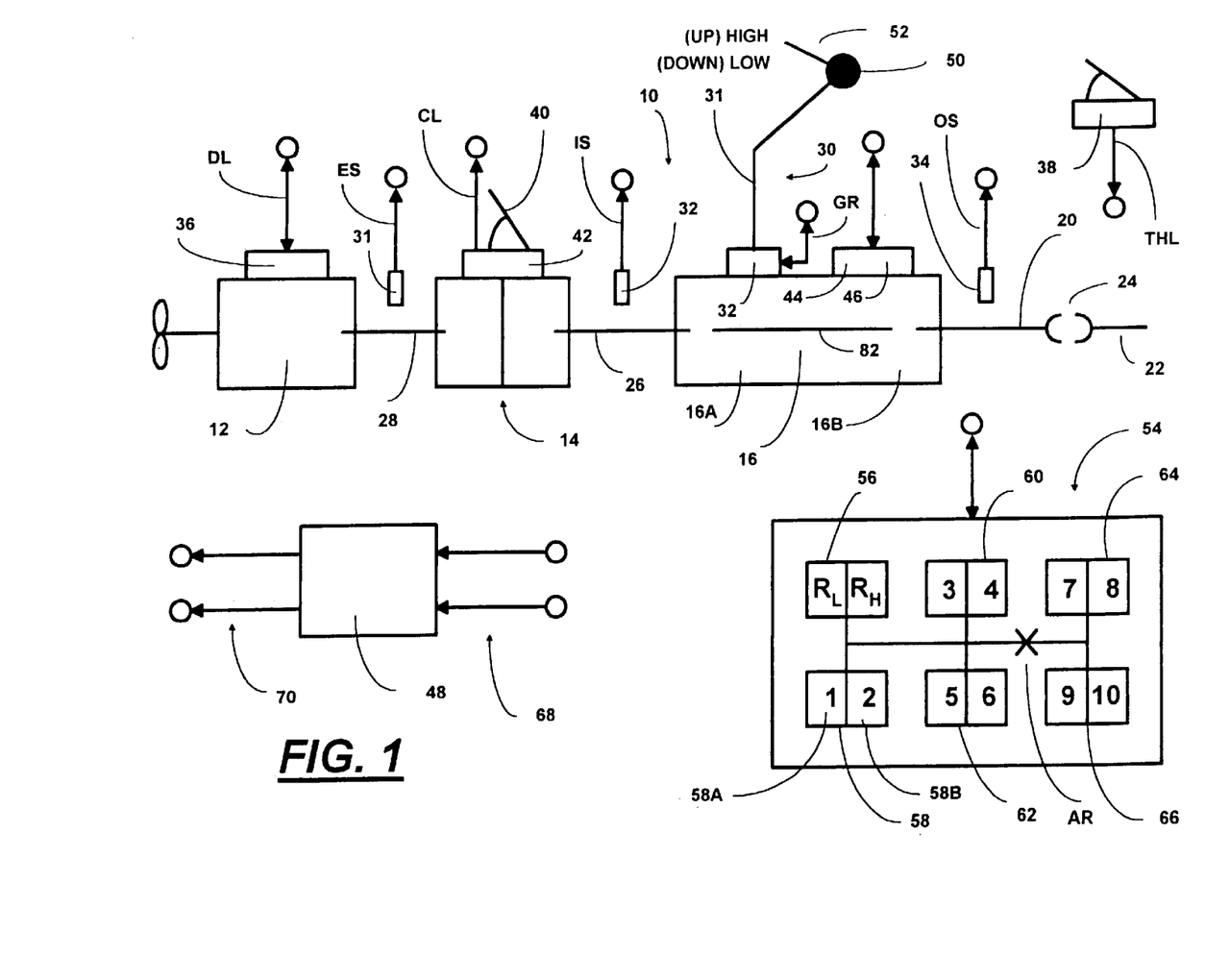
FIG. 1 is a schematic illustration of an ECU-assisted, nonsynchronized compound splitter-type mechanical transmission system advantageously utilizing the control techniques of the present invention.
Figure 2:
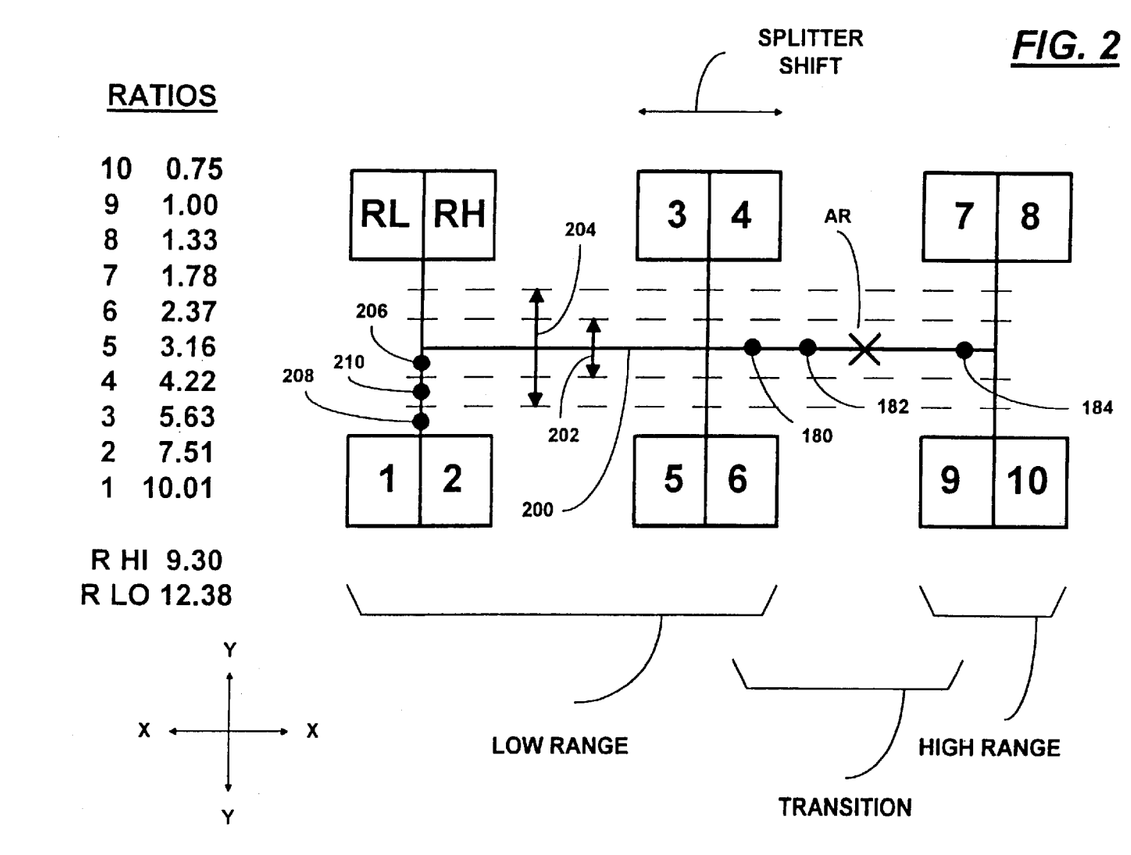
FIG. 2 is a chart illustrating the shift pattern and representative numerical ratios for the transmission of FIG. 1.
Figure 3:
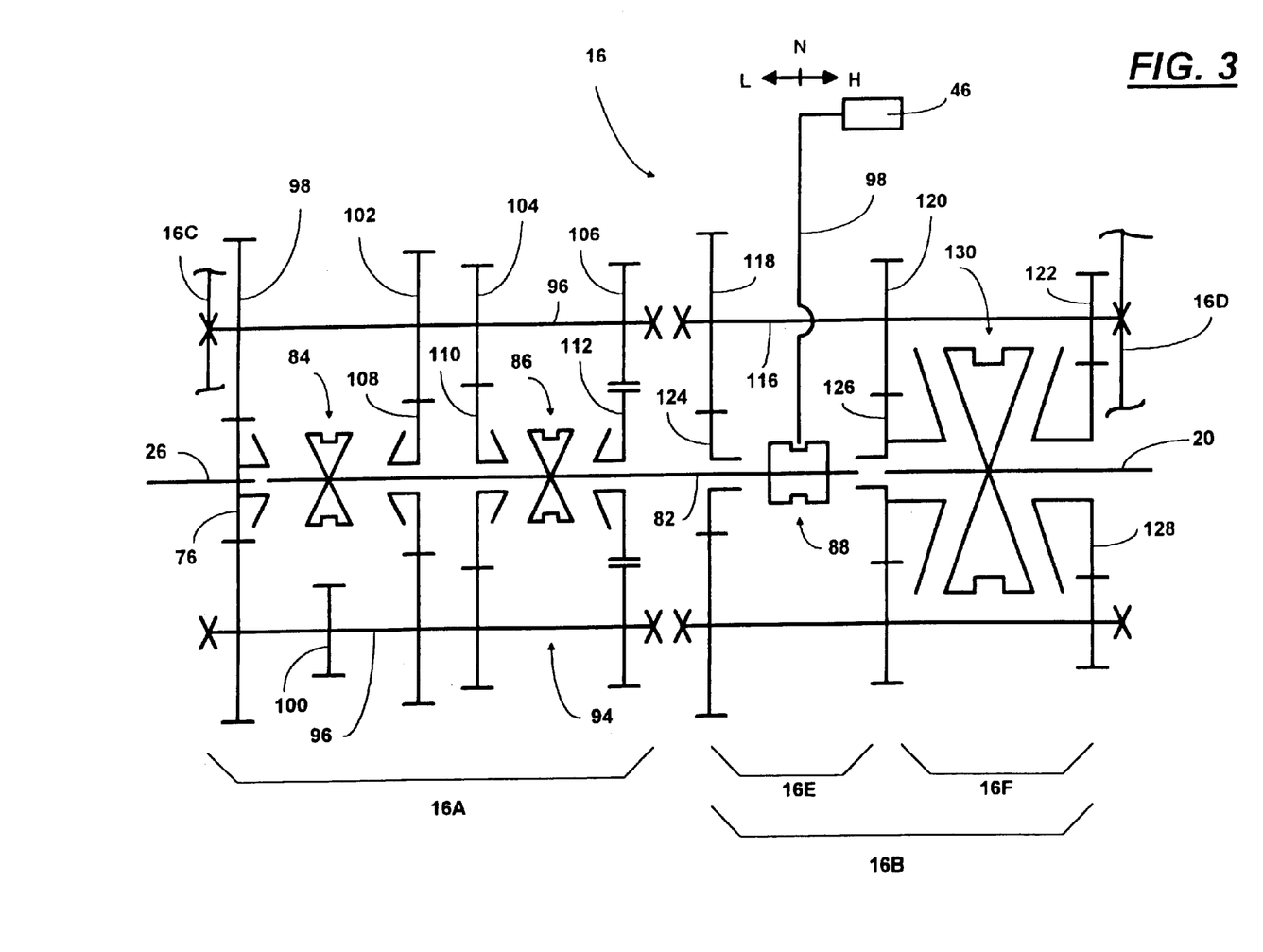
FIG. 3 is a schematic illustration of the structure of the compound mechanical transmission of FIG. 1.

A computer-assisted (i.e., microprocessor-based, controller-assisted) vehicular compound mechanical transmission system 10, particularly well suited to utilize the shift control of the present invention, may be seen by reference to FIGS. 1–3.

System 10 is of the type commonly utilized in heavy-duty vehicles, such as the conventional tractors of tractor/semi-trailer vehicles, and includes an engine, typically a diesel engine 12, a master friction clutch 14 contained within a clutch housing, a multiple-speed compound transmission 16, and a drive axle assembly (not shown). The transmission 16 includes an output shaft 20 drivingly coupled to a vehicle drive shaft 22 by a universal joint 24 for driving the drive axle assembly. The transmission 16 is housed within a transmission housing to which is directly mounted the shift tower of the shift lever assembly 30. The present system is equally applicable to remotely mounted shift levers, as are used in cab-over-engine types of vehicles.

FIG. 2 illustrates a shift pattern for assisted manual shifting of a combined range-and-splitter-type compound transmission shifted by a manually operated shift lever. Briefly, the shift lever 31 is movable in the side-to-side or X—X direction to select a particular ratio or ratios to be engaged and is movable in the fore and aft or Y—Y direction to selectively engage and disengage the various ratios. The shift pattern may include an automatic range shifting feature and automatically selected and/or implemented splitter shifting, as is known in the prior art. Manual transmissions utilizing shift mechanisms and shift patterns of this type are well known in the prior art and may be appreciated in greater detail by reference to aforementioned U.S. Pat. Nos. 5,000, 060 and 5,390,561.

Typically, the shift lever assembly 30 will include a shift finger or the like (not shown) extending downwardly into a shifting mechanism 32, such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272, 931.

In the automatic range shifting feature, as the shift lever moves in the transition area between the middle leg (¾–⅚) and the righthand leg (⅞–⁹⁄₁₀) of the shift pattern, it will cross a point, AR, which will actuate a mechanical or electrical range switch, or will be sensed by a position sensor, to cause automatic implementation of a range shift.

Shifting of transmission 16, comprising nonsynchronized, enlarged backlash main section 16A coupled in series to auxiliary section 16B, is semi-automatically implemented/assisted by the vehicular transmission system 10, illustrated in FIGS. 1–3. Main section 16A includes an input shaft 26, which is operatively coupled to the drive or crank shaft 28 of the vehicle engine 12 by master clutch 14, and output shaft 20 of auxiliary section 16B is operatively coupled, commonly by means of a drive shaft 24, to the drive wheels of the vehicle. The auxiliary section 16B is a splitter type, preferably a combined range-and-splitter type, as illustrated in U.S. Pat. Nos. 4,754,665 and 5,390,561.

The change-gear ratios available from main transmission section 16 are manually selectable by manually positioning the shift lever 31 according to the shift pattern prescribed to engage the particular desired change-gear ratio of main section 16A.

The system may include sensors 30 (for sensing engine rotational speed (ES)), 32 (for sensing input shaft rotational speed (IS)), and 34 (for sensing output shaft rotational speed (OS)), and providing signals indicative thereof. As is known, with the clutch 14 (ie., no slip) engaged and the transmission engaged in a known gear ratio, $ES=IS=OS*GR$ (see U.S. Pat. No. 4,361,060). Accordingly, if clutch 14 is engaged, engine speed and input shaft speed may be considered as equal. Input shaft speed sensor 32 may be eliminated and engine speed (ES), as sensed by a sensor or over a data link (DL), substituted therefor.

Engine 12 is electronically controlled, including an electronic controller 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor 38 may be provided or throttle position (THL) may be sensed from the data link. Gross engine torque (TEG) and base engine friction torque ($T_{BEF}$) also are available on the data link.

A manual clutch pedal 40 controls the master clutch 14, and a sensor 42 provides a signal (CL) indicative of clutch-engaged or -disengaged condition. The condition of the clutch also may be determined by comparing engine speed to input shaft speed if both signals are available. An auxiliary section actuator 44 including a range shift actuator and a splitter actuator 46 is provided for operating the range clutch and the splitter section clutch in accordance with command output signals from ECU 48. The shift lever 31 has a knob 50 which contains splitter selector switch 52 by which a driver's intent to initiate a splitter and/or compound shift may be sensed.

System 10 may include a driver's display unit 54 including a graphic representation of the six-position shift pattern with individually lightable display elements 56, 58, 60, 62, 64 and 66, representing each of the selectable engagement positions. Preferably, each half of the shift pattern display elements (i.e., 58A and 58B) will be individually lightable, allowing the display to inform the driver of the lever and splitter position for the engaged ratio.

The system includes a control unit or ECU 48, preferably a microprocessor-based control unit of the type illustrated in U.S. Pat. Nos. 4,595,986; 4,361,065 and 5,335,566, the disclosures of which are incorporated herein by reference, for receiving input signals 68 and processing same according to predetermined logic rules to issue command output signals 70 to system actuators, such as the splitter section actuator 46, the engine controller 36, the range shift actuator and/or the display unit 54. A separate system controller may be utilized, or the engine controller ECU 36 communicating over an electronic data link may be utilized.

As shown in aforementioned U.S. Pat. Nos. 5,651,292 and 5,661,998, the splitter actuator 46 is, preferably, a three-position device, allowing a selectable and maintainable splitter section neutral. Alternatively, a "pseudo" splitter-neutral may be provided by deenergizing the splitter actuator when the splitter clutch is in an intermediate, non-engaged position.

The structure of the 10-forward-speed combined range-and-splitter-type synchronized transmission 16 is schematically illustrated in FIG. 3. Transmissions of this general type are disclosed in aforementioned U.S. Pat. Nos. 5,000,060; 5,370,013 and 5,390,561.

Transmission 16 includes a non-synchronized, enlarged backlash main section 16A and an auxiliary section 16B, both contained within a housing including a forward end wall 16C, which may be defined by the clutch housing, and a rearward end wall 16D, but (in this particular embodiment) not an intermediate wall.

Input shaft 26 carries input gear 76 fixed for rotation therewith. The mainshaft 82 carries synchronized mainshaft clutches 84 and 86, and the mainshaft splitter clutch 88. Shift forks (not shown) are provided for shifting clutches 84 and 86 and are controlled by shift lever 31 acting on the shift assembly 32. Mainshaft 82 is independently rotatable relative to input shaft 26 and output shaft 20 and preferably is free for limited radial movement relative thereto.

As is well known, clutches 84 and 86 are double-acting devices movable fore and aft from the centered positions thereof to engage a selected main section ratio. By way of example, a first jaw clutch 84A is defined by a first array of clutch teeth 84B carried by the leftward end of clutch member 84, which are engageable with a second array of clutch teeth 84C carried by input gear 78.

The main section 16A includes two substantially identical main section countershaft assemblies 94, each comprising a main section countershaft 96 carrying countershaft gears 98, 100, 102, 104 and 106 fixed thereto. Gear pairs 98, 102, 104 and 106 are constantly meshed with input gear 76, mainshaft gears 108 and 110 and an idler gear (not shown), which is meshed with reverse mainshaft gear 112, respectively. Countershaft gear 100 is provided for driving a PTO or the like.

The auxiliary section 16B of transmission 16 includes a splitter section 16E and a range section 16F. Auxiliary section 16B includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter clutch 88 is fixed to mainshaft 82 for selectively clutching either gear 124 or 126 thereto, while synchronized range clutch 130 is fixed to output shaft 20 for selectively clutching either gear 126 or gear 128 thereto.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 or 126 is clutched to the main shaft. Splitter jaw clutch 88 is axially positioned by means of a shift fork 98 controlled by a three-position actuator, such as a piston actuator, which is responsive to a driver selection switch such as a button or the like on the shift knob, as is known in the prior art and to control signals from ECU 48 (see U.S. Pat. No. 5,661,998). Two-position synchronized range clutch assembly 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either piston actuator may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 16B is a three-layer auxiliary section of the combined range and splitter type providing four selectable speeds or drive ratios between the input (mainshaft 82) and output (output shaft 20) thereof. The main section 16A provides a reverse and three potentially selectable forward speeds. However, one of the selectable main section forward gear ratios, the low-speed gear ratios associated with mainshaft gear 110, is not utilized in the high range. Thus, transmission 16 is properly designated as a "(2+1)×(2×2)" type transmission providing nine or ten selectable forward speeds, depending upon the desirability and practicality of splitting the low gear ratio.

Splitter shifting of transmission 16 is accomplished responsive to initiation by a vehicle operator-actuated splitter button 52 or the like, usually a button located at the shift lever knob, while operation of the range clutch shifting assembly is an automatic response to movement of the gear shift lever between the central and rightwardmost legs of the shift pattern, as illustrated in FIG. 2. Alternatively, splitter shifting may be automated (see U.S. Pat. No. 5,435,212). Range shift devices of this general type are known in the prior art and may be seen by reference to aforementioned U.S. Pats. No. 3,429,202; 4,455,883; 4,561,325 and 4,663,725.

In a further alternative of the present invention, the shift knob will include a sensor or an intent-to-shift button by which the driver will indicate that he intends to initiate a lever shift sequence. Upon receiving the intent-to-shift signal, the controller will issue commands to the engine controller to relieve torque lock by fuel manipulations and possibly to auxiliary section actuator to preselect the required splitter shift. This will allow easy shifting from the engaged ratio into neutral without operator throttle manipulation or clutch disengagement. Engine manipulations to relieve torque lock without requiring clutch disengagement is described in greater detail in aforementioned U.S. Pat. Nos. 4,850,236 and 5,105,357.

Although the present invention is illustrated in the embodiment of a compound transmission not having an intermediate wall, the present invention is equally applicable to transmissions of the type illustrated in aforementioned U.S. Pat. Nos. 4,754,665; 5,193,410 and 5,368,145.

According to the illustrated embodiment of the present invention, and as more fully described in aforementioned U.S. Pat. No. 5,651,292, the interengaging clutch teeth provided on splitter clutch 88 and on splitter gear 124 and splitter/range gear 126 are of a relatively large backlash (i.e., about 0.020–0.060 inches for a 3.6-inch pitch diameter clutch), which will assure that almost any attempted splitter shift under full force will be completed.

The clutch 88 is moved by a shift fork 98 attached to a piston rod of the piston actuator assembly 44. Actuator assembly 44 may be a conventional three-position actuator (see U.S. Pat. No. 5,054,591, the disclosure of which is incorporated herein by reference) or an actuator of the type illustrated in U.S. Pat. Nos. 5,682,790 or 5,661,998 (the disclosures of which are incorporated herein by reference), wherein pulse width modulation of a selectively pressurized and exhausted chamber 144 may be used to achieve the three splitter positions (L, N, H) of the shift fork.

Preferably, the splitter clutch actuator 44 will be capable of applying a variable force, such as by pulse width modulation, of supply pressure. A force lesser than full force may be utilized when disengaging and/or when synchronous conditions cannot be verified.

In a preferred embodiment, the controller 48 is provided with logic rules under which, if the main section is engaged, a shift from splitter neutral into a selected target splitter ratio is initiated such that, under normal conditions, including proper operator fuel control, the synchronous error (which is equal to input shaft rotational speed minus the product of output shaft rotational speed and transmission target gear ratio) is expected to be equal to or less than a value selected to give smooth, high-quality shifts ((IS−(OS*GR))= ERROR≦REF). The timing is done in regard to sensed/ expected shaft speeds, shaft acceleration/deceleration and actuator reaction times.

In certain situations, the logic rules will recognize operating conditions wherein the preferred synchronous window (i.e., IS=(OS*GR)±60 RPM) must be expanded to accomplish a splitter shift, even at the expense of shift quality. These situations, usually associated with upshifts, include if shifting attempted at low engine speeds wherein expected engine speed at shift completion will be undesirably low, if deceleration of the output shaft is relatively high (dOS/ dt<REF), if the deceleration of the engine is relatively low (dES/dt>REF) and/or if the absolute value of the synchronous error is not approaching the normal value at an acceptable rate.

The position of the shift lever 31 or of the shifting mechanism 32 controlled thereby may be sensed by a position sensor device. Various positioning sensing assemblies are known in the prior art, with a preferred type illustrated in U.S. Pat. No. 5,743,143, assigned to the assignee of this application, the disclosure of which is incorporated herein by reference.

The sensor will provide a signal GR indicative of the position of shift lever 31 relative to the shift pattern illustrated in FIG. 2. Preferably, the rate of change of position (dGR/dt) also may be determined and utilized to enhance shifting of the system 10.

By way of example, referring to FIG. 2, if shift lever position can be sensed, the need for a fixed switch or the like at point AR to sense a required initiation of a shift between low range and high range is eliminated.

Further, as physical switches are no longer required, the shift pattern position at which a range shift will be commanded can be varied, such as to points 180, 182 or 184, to enhance system performance under various operating conditions.

If in first (1st) through fourth (4th), a shift into high range is unlikely and the auto range shift initiation point may be moved to position 184 (away from the expected shift lever path) to prevent inadvertent actuation of a range shift. If in sixth (6th) with a high engine speed, a shift into high range is likely and moving the auto range initiation point to position 180 will allow for a quicker initiation of a range shift.

According to the preferred embodiment of the present invention, the operator is allowed to control engine fueling unless the current vehicle operating conditions indicate that his/her operation of the throttle pedal will not allow the jaw clutches associated with the current target ratio to engage. If operating conditions, including operator setting of the throttle pedal, indicate that the operator will complete a splitter shift into target ratio, including a relatively rough shift, the engine will be fueled in accordance with operator throttle setting. If not, during some or all shifts, automatic engine fueling may occur.

The state of engagement (i.e., engaged or neutral) of the main transmission section 16A is an important control parameter for system 10. By way of example, according to the shift logic of the present invention, if main section neutral is sensed, the splitter clutch 86 is commanded to its neutral position. Also, if the main section is engaged while the splitter is in neutral, the system will not cause splitter engagement until substantial synchronous is sensed and may then initiate automatic fuel control if required. Of course, it is important to prevent or minimize false determinations of main section neutral and/or engaged conditions.

Referring to FIG. 2, a first narrow band 202 and a second wider band 204 of vertical displacements from the bight portion 200 are utilized to determine if the main section is or is not in neutral. If the transmission main section is not confirmed as being in main section neutral, the neutral confirmation band will be the narrower band 202. This will assure that the main section 16A is truly in neutral before declaring a main section neutral condition. If the transmission main section 16A is confirmed as being in neutral, the neutral confirmation band will be the wider band 204. This assures that mere overshooting of neutral or raking of main section jaw clutches will not be incorrectly interpreted as a main section engaged condition.

Sensing the shift lever at point 206 will always be interpreted as main section neutral, and sensing the shift lever at point 208 will always be interpreted as main section engaged. However, if the shift lever is sensed at point 210, this will not cause a previous determination of a neutral or engaged condition to change.

Vehicle operating conditions other than or in addition to currently engaged or neutral condition of the main section 16A may be used to vary the width of the neutral sensing bands.

In the illustrated transmission system 10, the system controller 48 can determine the identity of the target gear ratio $(GR_T)$ from the shift shaft position sensor 160 and the position of the splitter switch 52. The controller then determines if the main section or the splitter is engaged (assuming not a range shift) and what engine speed is needed to complete engagement of the target ratio $(GR_T)$ by engaging the splitter under current vehicle speed (as represented by output shaft speed OS). If it appears that the operator's engine fueling demand (throttle position THL) will not prevent engagement of the target ratio, the engine controller 36 will continue to fuel the engine in accordance with the operator throttle setting. If, however, given current engine speed, rate of change of engine speed and/or rate of change of vehicle speed, continuing to fuel the engine in accordance with operator demand (THL) will prevent completion of jaw clutch engagement for engaging the target ratio, the controller will command that the engine be fueled in a manner to allow completion of the shift and the operator's throttle position setting will be ignored. Upon completion of the shift, a throttle recovery technique (see U.S. Pat. No. 4,493, 228) will be used to return control of fueling to the driver/operator.

Figure 4:
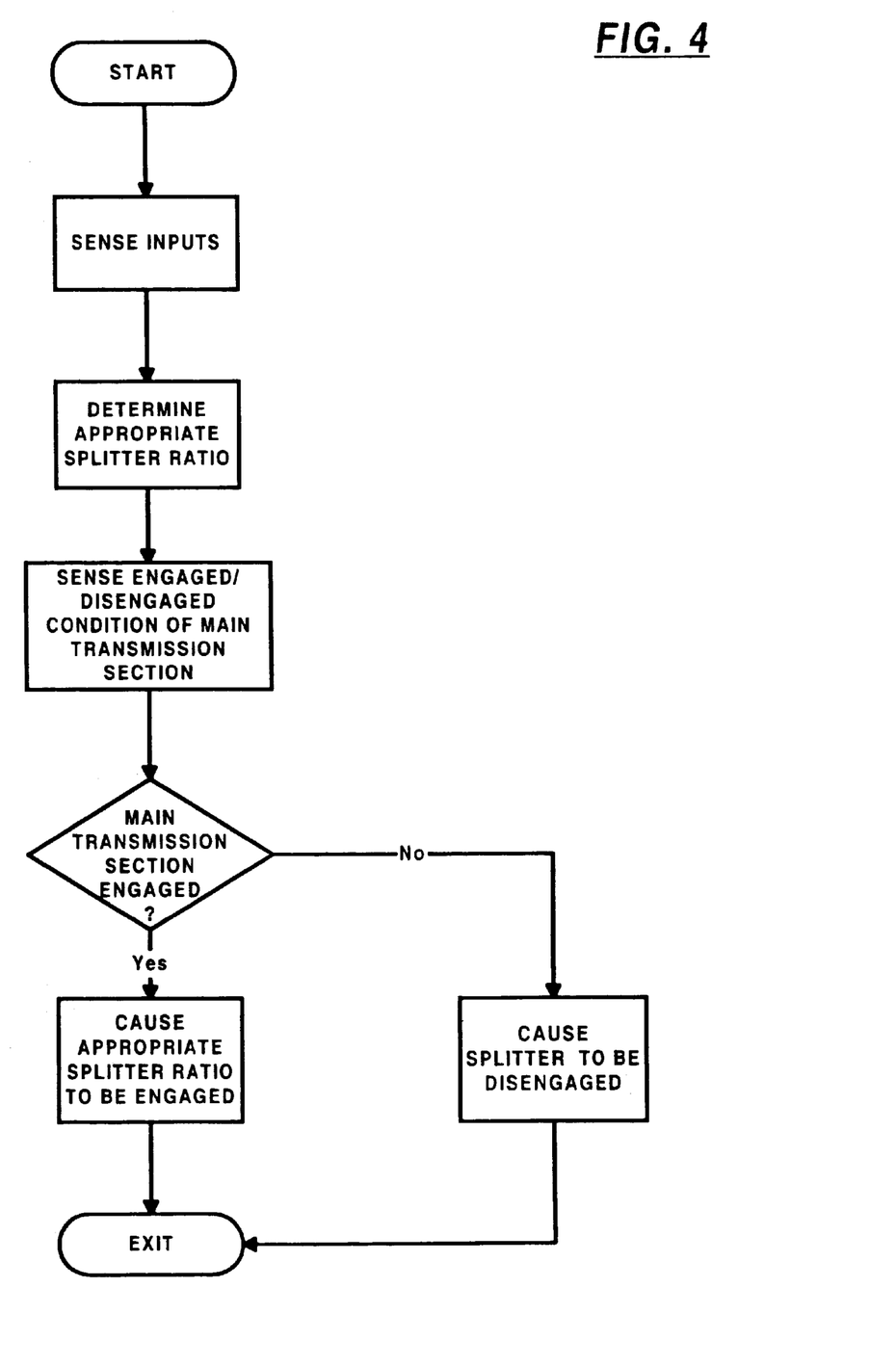
FIG. 4 is a schematic illustration, in flow chart format, of the control of the present invention.

According to the shift control of the present invention, whenever a shift in the main transmission section 16A is undertaken by shifting the main section to neutral, the controller 48 will cause the splitter section 16E to be shifted to splitter neutral. Due to the advantageous structure of transmission 16, including the use of splitter section 16E located behind (at the output end) the main section, and in front of the range section 16F, the main shaft 82 will be disconnected from all gearing and countershafts and will carry only its own inertia and that of the clutches 84, 86 and 88. With only this very low inertia to be clutched by the selected main section gear (76, 108, 110 or 11 2), only a relatively low torque must be absorbed by the main section clutches 84 and 86, even in an out-of-synchronous engagement. This allows the main section to be engaged with only very little force exerted by the operator on the shift lever 31, eliminates the need for shift-assist mechanisms, and allows considerably out-of-synchronous engagement.

With the main 16A and splitter 16E sections both in neutral, the input shaft is disconnected from the input shaft 26 and associated gearing (gears 76, 98, 102, 104, 106, 108, 110 and 112) and also from the output shaft 20 and its associated gearing (gears 118, 120, 122, 124, 126 and 128).

If the splitter did not disconnect the main shaft 82 from the vehicle load, the clutches would be exposed to the inertia of the countershafts, the gearing, the input shaft and certain master clutch components. This inertia would be around 0.21 pound-feet/second$^2$, while with the present invention, the inertia of the main shaft, main shaft washers and portions of the synchronizers carried by the main shaft is only about 0.007 pound-feet/second$^2$.

In the prior art, especially for manual transmissions, the jaw clutches were operated by two-position actuators and were provided with a relatively small backlash (i.e., about 0.008–0.012 inches backlash for a clutch having about a 3.6-inch pitch diameter) to prevent unduly harsh shifting. Typically, with the above backlash and the usual engagement forces, at greater than about 60 RPM input shaft synchronous error, the clutch teeth would ratchet or "buzz" and clutch engagement would not occur.

As is known (see U.S. Pat. No. 5,052,535, the disclosure of which is incorporated herein by reference), allowable relative rotational speed at which the positive clutches will properly engaged (i.e., sufficient clutch tooth penetration will occur) is a directly proportional function of the total effective backlash in the clutch system. The maximum allowable asynchronous conditions at which clutch engagement is allowed is selected in view of the most harsh clutch engagement which is acceptable.

In change-gear transmissions utilizing the non-synchronized positive clutch structures, especially for heavy-duty vehicles, for a given total backlash (i.e., a given maximum allowably harsh clutch engagement), the range of asynchronous conditions at which the clutch members will engage is often narrower than desirable under certain conditions, making shifting more difficult.

According to the present invention, and as more fully described in aforementioned U.S. Pat. No. 5,651,292, the interengaging clutch teeth provided on clutches 84 and 86 and gears 76, 108, 110 and 112 are of a relatively large backlash (i.e., about 0.020–0.060 inches for a 3.6-inch pitch diameter clutch), which will assure that almost any attempted shift will be completed.

This will not provide unduly harsh shifts, as, with the main transmission and the splitter sections in neutral, the main shaft 82 is not connected to either the input shaft 26 and associated gearing (gears 76, 98, 30 102, 104, 106, 108, 110 and 112) or the output shaft 20 and associated gearing (gears 118, 120, 122, 124, 126 and 128).

Upon sensing engagement of the main section in a selected ratio, the controller 48 will cause the splitter section 16E to be engaged in the appropriate splitter ratio. The appropriate ratio may be determined by shaft speeds, sensed shift lever position and/or by signals from switch 52 which may provide up/down and/or splitter-high/splitter-low shift signals.

Accordingly, it may be seen that a new and improved shift control for an assisted, non-synchronized, compound splitter-type mechanical transmission having an enlarged backlash main section which will reduce the necessity to synchronize transmission main section shifts is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A compound vehicular transmission system (10) comprising:

a compound splitter-type mechanical transmission (16) having an input shaft and an output shaft, said transmission having a shift-lever-shifted, non-synchronized main transmission section (16B) connected in series with a splitter-type auxiliary section, said main transmission section defining a plurality of selectable ratios engageable by non-synchronized, non-blocked jaw clutches comprising first and second arrays of interengageable clutch teeth, said first and second arrays interengageable clutch teeth having a pitch diameter of at least 2.5 inches and defining a backlash exceeding 0.020 inches, said auxiliary transmission section (16E) interposed between said main transmission section (16A) and said output shaft (20);

a splitter actuator (46) for selectively causing said splitter section to be shifted into a selected one of a first splitter ratio (low), a second splitter ratio (high), or a splitter-neutral (N) position, and a controller (48, 36) for receiving input signals (68) and processing same according to logic rules to issue command output signals (70) to system actuators including said splitter section actuator (44), said logic rules including rules for sensing a shift into a main transmission section ratio and into main transmission section neutral and effective, upon sensing a shift into main transmisison section neutral, to cause said splitter to be shifted into the splitter-neutral position.

2. The system of claim 1 wherein said logic rules further include logic rules for determining an appropriate splitter section engaged ratio and rules to cause engagement of said appropriate splitter section engaged ratio upon sensing engagement of a main transmission section ratio.

3. The system of claim 1 wherein said system includes a sensor (32) for providing a signal (GR) indicative of the position of said shift lever (31) in a shift pattern.

4. The system of claim 1 further comprising a range-type section (16F), said splitter section (16E) interposed said main transmission section (16A) and said range-type section (16F).

5. A compound change-gear transmission system comprising a lever-shifted, non-synchronized main transmission section connected in series with an auxiliary transmission section, said main transmission section defining a plurality of selectable ratios engageable by non-synchronized, non-blocked jaw clutches comprising first and second arrays of interengageable clutch teeth, said first and second arrays interengageable clutch teeth having a pitch diameter of at least 2.5 inches and defining a backlash exceeding 0.020 inches, said auxiliary transmission section comprising an auxiliary section input shaft driven by said main transmission section and an output shaft, said auxiliary transmission section comprising:

- a splitter gear, a splitter/range gear and a range gear, all generally coaxial with and rotatable relative to said auxiliary section input shaft and said output shaft;
- an auxiliary section countershaft assembly comprising an auxiliary countershaft rotationally supported in said housing, a first auxiliary contershaft gear rotationally fixed to said auxiliary countershaft and constantly meshed with said splitter gear, a second auxiliary countershaft gear rotationally fixed to said auxiliary countershaft and constantly meshed with said splitter/range gear, and a third auxiliary countershaft gear rotationally fixed to said auxiliary countershaft and constantly meshed with said range gear;
- a three-position splitter clutch assembly fixed for rotation with said auxiliary section input shaft and having a first position for coupling said splitter gear to said auxiliary section input shaft, a second position for coupling said splitter/range gear to said auxiliary section input shaft, and a third position for disconnecting both said splitter gear and said splitter/range gear from said auxiliary section input shaft;
- a two-position range clutch assembly fixed for rotation with said output shaft and having a first position for coupling said splitter/range gear to said output shaft and a second position for coupling said range gear to said output shaft;
- control means for independently positioning said splitter clutch assembly in a selected one of the three positions thereof and said range clutch assembly in a selected one of the two positions thereof; and
- a system controller for receiving input signals and issuing command output signals to system actuators including said control means.

6. The system of claim 5 wherein said system controller receives input signals indicative of the engaged and disengaged condition of said main transmission section, said system controller effective to cause said splitter clutch to be positioned in the third position thereof upon determining that said main transmission section is in the disengaged position thereof.

7. A method for controlling shifting in a compound vehicular transmission system (10) comprising a compound splitter-type mechanical transmission (16) having an input shaft and an output shaft, said transmission having a shift-lever-shifted, non-synchronized main transmission section (16B) connected in series with a splitter-type auxiliary section, said main transmission section defining a plurality of selectable ratios engageable by non-synchronized, non-blocked jaw clutches comprising first and second arrays of interengageable clutch teeth, said first and second arrays interengageable clutch teeth having a pitch diameter of at least 2.5 inches and defining a backlash exceeding 0.020 inches, said auxiliary transmission section (16E) interposed between said main transmission section (16A) and said output shaft (20), a splitter actuator (46) for selectively causing said splitter section to be shifted into a selected one of a first splitter ratio (low), a second splitter ratio (high), or a splitter-neutral (N) position,

- a controller (48, 36) for receiving input signals (68) and processing same according to logic rules to issue command output signals (70) to system actuators including said splitter section actuator (44), said method comprising:
- sensing a shift into a main transmission section ratio and into main transmission section neutral; and
- upon sensing a shift into main transmisison section neutral, causing said splitter to be shifted into the splitter-neutral position.

8. The method of claim 7 further comprising determining an appropriate splitter section engaged ratio and causing engagement of said appropriate splitter section engaged ratio upon sensing engagement of a main transmission section ratio.

9. The system of claim 1 further comprising an operator-set fuel throttle demand device for providing a signal indicative of operative engine fueling demand (THL), a fuel-controlled engine, an engine controller for controlling the supply of fuel to the engine in response to command signals, said engine controller having at least one mode of operation wherein engine fueling is provided in accordance with said operator-set fuel throttle demand device and at least one mode of operation wherein engine fueling is provided to achieve a requested engine speed (ES) value; said logic rules further comprising:

- determining if the operator is attempting to engage a specific target gear ratio ($GR_T$) and the main transmission section is engaged and the splitter section is not engaged;
- determining if current engine speed and throttle demand device setting will prevent engagement of said target gear ratio;
- if current engine speed and throttle demand device setting will not prevent engagement of said target gear ratio, commanding the engine controller to fuel said engine in accordance with said operator-set fuel throttle demand device; and
- if current engine speed and throttle demand device setting will prevent engagement of said target gear ratio, commanding said engine controller to cease fueling said engine in accordance with said operator-set fuel throttle demand device and instead to fuel said engine to achieve a requested engine speed value determined to allow engagement of said target ratio.

10. The system of claim 9 wherein said control unit is microprocessor based.

11. The system of claim 10 wherein said control unit communicates over an electronic data link (DL) conforming to an industry recognized protocol (SAE J-1922/1939).

* * * * *